2,971,022
// Patented Feb. 7, 1961

2,971,022
METHOD OF RING CLEAVAGE OF 2-FUROIC ACID

Masuo Murakami, 1-39 3-Cho Sekimori-Cho Suma-ku, and Saburo Senoh, 274 Mori Motoyama-Cho Nada-ku, both of Kobe-Shi, Hyogo-Ken, Japan No Drawing. Filed Mar. 13, 1956, Ser. No. 571,126

Claims priority, application Japan Mar. 28, 1955

6 Claims. (Cl. 260—483)

This invention relates to the synthesis of the dialkyl α-ketoglutarate from an intermediate product of alkyl 2,5-di-alkoxy-2,5-dihydro-2-furoate formed as a result of the reaction of difuroyl peroxide or perfuroic acid with alcohols and a hydrogen halide such as hydrochloric acid.

An object of this invention is to provide a method of preparing starting materials f : the manufacture of useful chemical products, such as glutamic acid and other chemical compounds, from readily available furfural by a simple chemical treatment.

It is known that the ring cleavage of 2-furoic acid cannot be attained in acidic condition and, for this reason, the industrial use of furfural, which is an inexpensive raw material available in a large quantity, has been limited. However, the process described herein provides a means of cleaving the furan ring of 2-furoic acid under acidic condition to give the dialkyl α-ketoglutarate in good yields. A chemical process of this type has never been achieved hitherto and has a significantly important meaning in the chemical industry.

Details pertaining to this invention are as follows:

Difuroyl peroxide or perfuroic acid is prepared from furfural according to any known method of preparation and is suspended in an alcohol and the suspension saturated with dry hydrogen chloride gas. The reaction mixture is stirred for several hours at room temperature, whereupon a clear homogeneous solution results. The solution thus obtained contains the alkyl 2,5-dialkoxy-2,5-dihydro-2-furoate. The formation of this compound is shown by the results of the following experiments:

The addition of a solution of 2,4-dinitrophenylhydrazine sulfate in an alcohol to the solution obtained above gives the bis-2,4-dinitrophenylhydrazone in crystalline form. This crystalline substance is identical with the alkyl α,δ-dioxo-β-buten-α-carboxylate bis-2,4-dinitrophenylhydrazone prepared by N. N. Clauson-Kass and F. Limborg, Acta Chem. Scand., vol. 6, page 551 (1952). An intermediate product formed in the course of the reaction resulting in the clear solution undergoes entirely different chemical change to give the dialkyl α-ketoglutarate (as proved by the addition of 2,4-dinitrophenylhydrazine), which has been anticipated to be produced by the process of this invention, when the said intermediate is allowed to stand for a long period of time at room temperature or is heated for a short time or distilled. Thus, dialkyl α-ketoglutarate is produced from alkyl 2,5-dialkoxy-2,5-dihydro-2-furoate.

The following experiments prove that the chemical change mentioned above has taken place: When a solution of 2,4-dinitrophenylhydrazine sulfate in alcohol is added to the reaction mixture obtained as described above, there is produced crystalline mono-2,4-dinitrophenylhydrazone which is different from the bis-hydrazone mentioned previously. The substance is identical with the dialkyl α-ketoglutarate 2,4-dinitrophenylhydrazone synthesized according to the method described by L. Friedman and E. Kosower, "Org. Syntheses," vol. 26, page 42 (1946); W. Wislisenus and M. Waldmüller, Berichte (Deutsche, Chem. Gesell.), vol. 44, page 1564 (1911). Thus, the formation of dialkyl-α-ketoglutarate is proved by the addition of 2,4-dinitrophenylhydrazine sulfate to the reaction mixture containing dialkyl α-ketoglutarate.

Theoretical yields, based on the peroxide, of the dialkyl α-ketoglutarate and the alkyl 2,5-dialkoxy-2,5-dihydro-2-furoate are as high as 60%. This means that the dialkyl-α-ketoglutarate and the alkyl 2,5-dialkoxy-2,5-dihydro-2-furoate are obtained from the peroxide in theoretical yields of 60%. The isolation of an alkyl 2,5-dialkoxy-2,5-dihydro-2-furoate is shown by the formation of ethyl α,δ-dioxo-β-buten-α-carboxylate bis 2,4-dinitro-phenylhydrazone in Example I below). The 60% yield was determined experimentally with respect to Example I. The glutarate was obtained from ethyl-2.5-diethoxy-2.5-dihydro-2-furoate in a nearly 100% yield. The glutarate was then obtained from difuroyl peroxide in a nearly 60% yield of theoretical.

The chemical reaction involved in the process of this invention is shown below:

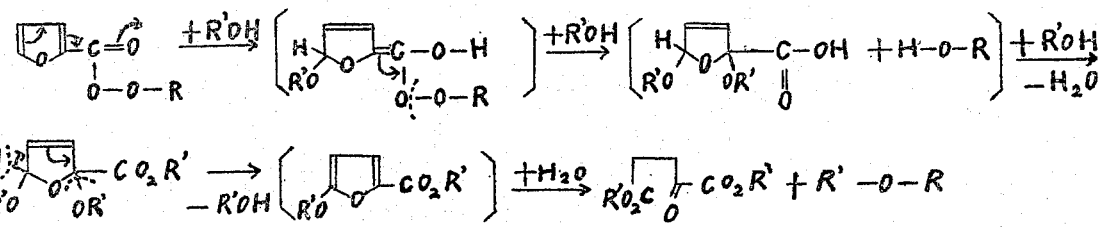

R=2-Furoyl,H    R'=Alkyl

Several examples of this reaction are shown below:

Example 1

Furfural was oxidized to 2-furoic acid which in turn was further converted into 2-furoyl chloride. The said 2-furoyl chloride was treated with sodium peroxide by the method described by N. A. Miles and A. McAleoy, J. Am. Chem. Soc., vol. 56, page 1219 (1934), to give 2-difuroyl peroxide.

Thirty-three and seven-tenths grams of 2-furoyl peroxide were suspended in 115 ml. of absolute ethanol in a vessel equipped with a stirrer. Alternately, as indicated above, perfuroic acid may be employed. After the vessel was cooled by cold water and the suspension therein stirred, dry gaseous hydrogen chloride was passed into the suspension to saturation. By a stirring of several hours continuously at room temperature without a passing of hydrogen chloride, the suspension was converted gradually into 180 grams of a slightly colored homogeneous solution.

Ten grams of the solution thus obtained were treated with a mixture of 3.5 grams of 2,4-dinitrophenylhydrazine, 41.5 ml. of methanol, and 7.0 ml. of concentrated sulfuric acid, whereupon a crystalline substance was immediately obtained. After a filtering and drying of the substance, 1.8 grams of red crystalline solid of ethyl α,δ-dioxo-β-buten-α-carboxylate bis-2,4-dinitrophenylhydrazone was obtained. The thus obtained filtrate was allowed to stand for several days, and a minor quantity of the same crystalline substance was obtained from the filtrate.

Recrystallization from nitrobenzene yielded red fine needles, M.P. 241–242° C. (dec.). There are no published data relative to this compound.

|  | C (percent) | H (percent) | N (percent) |
|---|---|---|---|
| Anal.: |  |  |  |
| Calc'd for C₁₉H₁₆O₁₀N₈ | 44.19 | 3.12 | 21.70 |
| Found | 44.55 | 3.11 | 21.23 |

*Example II*

Thirty grams of the slightly colored homogeneous solution given in the Example I were refluxed in a water bath for an hour. The system was treated with a solution of 5.5 grams of 2,4-dinitrophenylhydrazine, 65 ml. of methanol, and 11.0 ml. of concentrated sulfuric acid. A crystalline solid separated out immediately and was then recrystallized several times from ethanol, whereby 4.35 grams of orange-colored needles of ethyl methyl α-ketoglutarate 2,4-dinitrophenylhydrazone, M.P. 117–120° C. was obtained. This compound has never been previously prepared.

|  | C (percent) | H (percent) | N (percent) |
|---|---|---|---|
| Anal.: |  |  |  |
| Calc'd for C₁₄H₁₆O₈N₄ | 45.65 | 4.38 | 15.21 |
| Found | 45.94 | 4.49 | 15.18 |

*Example III*

Thirty grams of the slightly colored homogeneous solution given in the Example I were refluxed in a water bath for an hour. The reaction mixture was treated with a solution of 5.5 grams of 2,4-dinitrophenylhydrazine, 80 ml. of ethanol, and 11.0 ml. of concentrated sulfuric acid. A crystalline solid separated out immediately was then recrystallized several times from ethanol, whereupon was obtained 5.19 grams of orange-colored needles of diethyl α-ketoglutarate 2,4-dinitrophenylhydrazone, M.P. 86–89° C. This compound has also never been previously prepared.

|  | C (percent) | H (percent) | N (percent) |
|---|---|---|---|
| Anal.: |  |  |  |
| Calc'd for C₁₅H₁₈O₈N₄ | 47.12 | 4.75 | 14.66 |
| Found | 47.17 | 4.97 | 14.46 |

*Example IV*

After distilling off in vacuo the excess of alcohol from 30.0 grams of the slightly colored homogeneous solution given in Example I, the residual liquid was distilled in vacuo.

The first fraction, having a boiling point of 64–68° C. at 6 mm., crystallized completely. This product, having a melting point of 32–33° C. weighed 3.0 grams and was identified as ethyl 2-furoate. The second fraction derived by heating the remainder to at least its boiling point of 110°–120° C. at 6 mm. was 4.2 grams of a yellow liquid which gave the same hydrazone derivative as the one in Example III by the treatment indicated in Example III, column 3, lines 38 to 41.

*Example V*

On being allowed to stand for a month, the slightly colored homogeneous solution given in the Example I yielded the same products as the one in the preceding Example III by the same treatment with a solution of 2.4-dinitrophenylhydrozine, ethanol and concentrated sulfuric acid which gives diethyl α-ketoglutarate 2.4-dinitrophenylhydrozine.

Yields of the compounds produced in the examples given above are over 60%, based on the peroxide.

The examples given above show only a few typical methods of preparation. Although it may be necessary to modify slightly the said processes such as, for instance, when ethanol is replaced by other appropriate alcohol or by any other chemical compounds which bring about a reaction similar to that brought about by the alcohols, all of these modifications are included within the invention as long as the main course of the process does not depart from the process described herein.

This invention pertains, as mentioned above, to a chemical reaction involving the cleavage of the furan nucleus of 2-furoic acid under acidic condition, which has never been heretofore believed possible. The invention makes it possible to prepare readily glutamic acid and other substances of industrial importance from furfural which is readily available as a raw material. From the standpoint of chemistry and of chemical industry, a new field has been exploited to provide this unique process.

What we claim:

1. A method for the production of a diethyl alpha-ketoglutarate which comprises reacting a substance selected from the group consisting of difuroyl peroxide and perfuroic acid with hydrogen chloride and ethanol at a temperature not exceeding room temperature to form ethyl 2,5-diethoxy-2,5-dihydro-2-furoate and allowing the reaction mixture containing said ethyl 2,5-diethoxy-2,5-dihydro-2-furoate to stand at room temperature.

2. The method of claim 1 wherein the reaction is carried out with an excess of ethanol acting as a solvent.

3. The method of claim 1 wherein the ethanol is saturated with hydrogen chloride.

4. A method for the production of diethyl alpha-ketoglutarate which comprises reacting a substance selected from the group consisting of difuroyl peroxide and perfuroic acid with hydrogen chloride and ethanol at a temperature not exceeding room temperature to form ethyl 2,5-diethoxy-2,5-dihydro-2-furoate and heating the reaction mixture containing said ethyl 2,5-diethoxy-2,5-dihydro-2-furoate at the boiling point of the ethanol.

5. The method of claim 4 wherein the reaction is carried out with an excess of ethanol acting as a solvent.

6. The method of claim 4 wherein the ethanol is saturated with hydrogen chloride.

References Cited in the file of this patent
UNITED STATES PATENTS

| 2,436,532 | Singleton | Feb. 24, 1948 |
| 2,475,097 | Jones | July 5, 1949 |
| 2,515,304 | Jones | July 18, 1950 |

OTHER REFERENCES

Gelissen: Rec. Trav. Chim. 43:359–66 (1924).
Milas: J.A.C.S. 56:1219–1225 (1934).